2,998,317
METHOD OF PRODUCING CEREAL FLAKES
Stanley H. Reesman, Battle Creek, Mich., assignor to General Foods Corporation, White Plains, N.Y., a corporation of Delaware
No Drawing. Filed Dec. 28, 1959, Ser. No. 862,097
6 Claims. (Cl. 99—80)

This invention relates to a new and improved process for the production of ready-to-eat breakfast cereals. More particularly, the invention relates to a method of preparing ready-to-eat breakfast cereal products in the form of toasted flakes.

In the production of ready-to-eat breakfast cereals it is generally required that the starch-containing material be prepared in the form of a moist dough say of 30–40% moisture, which is eventually cooked to gelatinize the starch in the dough and transform it into a tenacious pliable mass capable of further handling. In such later handling the cooked dough mass is extruded and subdivided into dough pieces which may be shaped and eventually flaked and oven toasted to produce a desirable blistered crisp product.

In the production of breakfast cereal products, it is important that the cereal dough be cooked to a uniform degree for efficacy in flaking. To explain, in the present commercial process for making breakfast cereals in flake form a number of processing steps are involved which call for considerable capital investment and operating expense. Generally, the material of cereal grains either in grit or dough form is cooked at a moisture level ranging upward from 30% for 10–150 minutes in the presence of various flavoring materials, the longer cooking periods being required in the case of grits. Cooking is customarily carried out by steaming the ingredients in a pressure cooker where the materials can be gelatinized under pressures ranging from 15 to 30 p.s.i.g. The cooked material at the aforesaid high moisture level must then be dried to about 20% moisture and tempered for an additional extended period, say at least one hour, and ranging up from four to eight hours for larger particles such as corn grits. This moisture reduction and tempering is for the purpose of permitting the mass of grains or dough pieces to be flaked. Unless such drying is practiced the grain or dough pieces will adhere to the flaking roll or its dry knife making it impossible to get a clean, distinct flake for later toasting.

Attempts have been made in the prior art to improve upon the present commercial processes. For example, U.S. Patent No. 2,882,162 to Holahan, discloses a process for preparing breakfast cereals wherein the cereal stock after cooking is dried at a temperature of from 200–250° F. for from 15 to 90 minutes. The dried pieces are then held for a period of time of about one hour to 6 hours to regulate the degree of pucker. However, the Holahan process, while being an improvement over the prior art, still lacks features which are desirable in a process for preparing breakfast cereals. For example, Holahan requires extended drying periods (15 to 90 minutes) and extended tempering periods (1 to 6 hours) to obtain the product of the Holahan process.

It is an object of the present invention to provide a process for preparing breakfast cereals having a high degree of blistering and curl which remain crispy and crunchy when milk is added to them. It is a further object of the present invention to provide a breakfast cereal having a low bulk density. It is yet a further object of the present invention to provide a process for preparing breakfast cereals wherein a very short period of time is required to obtain the flake product after cooking. It is still a further object of the present invention to provide a process for preparing breakfast cereals wherein the cereal pieces do not have to be tempered after cooling.

It has now been discovered that the objects of the present invention may be obtained by subjecting cooked grain pieces to a process which comprises drying the cooked grain pieces at a temperature of 200° F.–400° F. for a period of ½ to 10 minutes, immediately and rapidly cooling the dried pieces to a temperature below 120° F. in less than 10 minutes and immediately flaking the dried, cooled pieces. By the term "grain pieces" is meant grain pieces such as whole grain wheat, corn grits, etc. and dough pieces or pellets prepared from cereal grain flour.

In accordance with the present invention, grain pieces may be cooked by any common cooking means, and when prepared from cereal grain flour, may be pelletized after cooking. Cooking may be carried out in a pressure cooker for a given period of time under 10 to 30 pounds pressure by forming a moist, granular mixture of the cereal grain flour, agglomerating the mixture while uniformly distributing the moisture by tumbling in a confined vessel with a live steam atmosphere whereby the farinaceous material is cooked or gelatinized. Cookers of either the continuous or batch-type may be employed to gelatinize the starch of the cereal grain flour; preferably such cooking will be carried out in a continuous cooker, a typical operation involving introduction of the pellet or agglomerates to the chamber between the rotating flights of a screw or auger with a steam jacketed barrel therearound. Alternatively, the dough pellets can be cooked in such a continuous fashion in the chamber between a screw and a barrel by the direct introduction of steam co-current or countercurrent to the travel of the pellets. In addition, the dough pellets may be cooked by a combination of these means.

If the cooked cereal grain flour is not in the form of pellets subsequent to cooking, such cereal grain flour may then be pelletized by extruding through a pelletizer or any device having a multiple of small diameter orifices. The extruded material may then be cut into any desired length to form the pellets. The cereal grain pellets which may be employed in accordance with this invention may be cooked by any conventional cereal grain cooking process.

The cooked grain pieces are then dried at a temperature of 200–400° F. for a period of ½–10 minutes, preferably at a temperature of 250–325° F. for a period of ½ to 5 minutes and most preferably at a temperature of 300° F. for a period of ½ to 3 minutes. The grain pieces are dried to a moisture content of 13% to 25%, preferably 13% to 19%, and most preferably 17% to 19%. It has been found undesirable to dry for too long a period of time at a temperature above 300° F., such treatment resulting in excessive fines due to powdering of the grain pieces. Temperatures above 350° F. are undesirable since it is difficult to control the drying of the pellets without some of them being subjected to burning. The cooked, dried grain pieces are then immediately cooled to a temperature below 120° F. in a period of less than 10 minutes. The time required to cool the grain pieces should be in the order of 1–10 minutes and preferably 2–3 minutes. Such cooling may be carried out by passing cool air across a moving belt of such pellets at a velocity of 250–500 feet per minute and preferably 450 feet per minute although higher velocities of air may be employed, if desired.

The cooled grain pieces are then immediately flaked between flaking rolls to produce the desired blistered, curled product. If the grain pieces are not immediately flaked, within a period of less than 15–20 minutes after cooling, preferably within 5–15 minutes after cooling, and most preferably within 0–5 minutes after cooling, the advantages of the present invention are not obtainable. The product obtained when flaking is not carried out immediately is a dull, lifeless, blister-free flake. Such flakes are very similar to the undesirable flakes obtained by the prior art which employs a tempering step after cooling.

The present invention is more fully described by reference to the accompanying example.

EXAMPLE 1

Oat flakes formula

| Ingredients: | Parts by weight, percent |
| --- | --- |
| Oat flour | 60–70 |
| Rice flour | 7–12 |
| Soy flour | 5–10 |
| Sucrose | 5–15 |
| Lecithin | 0.05–0.15 |
| Salt | 2–4 |

*Process.*—To the above formula of ingredients sufficient moisture is added to form a mixture ranging in moisture content from 25%–35%, preferably 30% moisture. The most farinaceous mixture should not exceed a moisture content above 40% otherwise the product will not nucleate in the appropriate amounts to produce the cooked agglomerated dough pieces desired. On the other hand, a moisture content below 20% should not be employed since the required degree of gelatinization of the starch will not be obtained in the cooking chamber and, consequently, additional cooking of the agglomerates will be called for. The foregoing formula includes sugar and other flavorings which may be added to the farinaceous ingredients at this point. In producing the moist flour mixture care should be exercised to insure that a sufficient distribution of moisture is provided for, which distribution is evidenced by a loose crumbly feeling in the hand.

The moistened farinaceous material was introduced to one end of a continuous cooking chamber which comprised an upwardly inclined rotor having flights thereon complementary to a steam jacketed cylinder. A live-steam atmosphere at a pressure greater than atmosphere and ranging from 5–15 p.s.i.g. was introduced into the chamber in a manifold manner. The diameter of the screw flights was about 12 inches and had a pitch of approximately 12 inches; the screw had a length of about 12 feet and at its upper extremity communicates with an outlet valve through which finished agglomerates issue continuously.

The moist flour mixture was introduced at a rate sufficient to permit its transfer upwardly along the inclined lower surface of the containing vessel in a manner whereby the flour particles become further moistened and agglomerate progressively as they continued their upward travel to the point of issuance.

The farinaceous material generally was cooked to the extent that the starch particles were fully gelatinized. Under the conditions herein specified this cooking occurred in a period of four to eight minutes.

The agglomerated product issuing from the foregoing apparatus was characterized by an apparent agglomeration of the flour mixture in the form of discrete dough pieces ranging generally in size from ⅛″ to ⅜″.

The dough pieces of agglomerated starch-containing material had a moisture content issuing from the cooker ranging anywhere from 27% to 40%, the moisture content being only slightly elevated by reason of the condition of the steam in the course of cooking. The cooked dough pieces were thereupon introduced directly to a suitable extruder wherefrom the dough piece was extruded without further cooking and cut into compact pellets of a relatively uniform size. The pellets had a diameter of about 3/16″. The pellets were then dried in 3 minutes on a travelling screen drier to a moisture content of 13% to 19% by use of circulating hot air at a temperature in the neighborhood of 300° F.

The dried pellets were immediately cooled to 80° F. by passing cool air having a velocity of 450 feet per minute over a moving belt of the pellets, the cooling accomplished in 3 minutes.

The cooled, dried pellets were then immediately introduced into flaking rolls having spacing of 0.03″ to produce a flake. The flaked pieces were then toasted in a conventional travelling screen drier at a temperature of 250–350° F.

The resulting product was characterized by a uniformly blistered, crisp, curled flake which substantially retained this condition upon the addition of liquids such as milk or milk and cream.

The total time required to process the cooked pellets and to prepare them for toasting is in the order of 1½ to 20 minutes, far less than has been heretofore possible by processes of the prior art.

The preceding example illustrates one embodiment of the present invention, but it is to be understood that this example is for purposes of illustration only and that the invention is not limited thereto since various changes can be made by those skilled-in-the-art without departing from its scope and spirit, reference being had to the appended claims for the limitations of the invention.

What is claimed is:

1. A method of producing cereal flakes which comprises drying cooked grain pieces at a temperature of 200–400° F. for a period of ½ to 10 minutes, to obtain a moisture content of 13%–25%, immediately and rapidly cooling said dried pieces to a temperature below 120° F. in less than 10 minutes, and immediately flaking said dried, cooled pieces.

2. A method of producing cereal flakes which comprises drying cooked grain pieces at a temperature of 250–325° F. for ½ to 5 minutes to obtain a moisture content of 13%–25%, immediately and rapidly cooling said dried pieces to a temperature below 100° F. in less than 5 minutes, and flaking said dried, cooled pieces.

3. A method of producing cereal flakes which comprises drying cooked grain pieces at a temperature of 300° F. for ½ to 3 minutes to obtain a moisture content of 13–19%, immediately and rapidly cooling said dried pieces to a temperature below 100° F. in 2 to 3 minutes, and immediately flaking said dried, cooled pieces.

4. A method of producing cereal flakes which comprises drying cooked cereal grain pieces at a temperature of 300° F. for ½ to 3 minutes to obtain a moisture content of 17–19%, immediately passing air at room temperature over said dried pieces at a velocity of 250–500 feet per minute to cool said dried pieces to a temperature of 70–100° F. in 1 to 10 minutes, and immediately flaking said dried, cooled pieces.

5. A method of producing cereal flakes which comprises drying cooked cereal grain pieces at a temperture of 300° F. for ½ to 3 minutes to obtain a moisture content of 17–19%, immediately passing air at room temperature over said dried pieces at a velocity of 450 feet per minute to cool said dried pieces to a temperature of 70–100° F. in 2 to 3 minutes, and immediately flaking said dried, cooled pieces.

6. A method of producing cereal flakes which comprises agglomerating a moist granular mixture of substantially uncooked farinaceous material into discrete dough pellets, cooking said pellets to gelatinize the starch contained therein, drying the pellets at a temperature of 200–400° F. for a period of ½ to 10 minutes to obtain a moisture content o 13%–25%, immediately and rapidly cooling said dried pellets to a temperature below 120° F. in less than 10 minutes, and immediately flaking said cooled, dried pellets.

References Cited in the file of this patent

UNITED STATES PATENTS

| | | |
|---|---|---|
| 400,835 | Donelson | Apr. 2, 1889 |
| 470,140 | Donelson | Mar. 1, 1892 |
| 1,035,836 | Anderson | Aug. 20, 1912 |
| 1,925,267 | McKay | Sept. 5, 1933 |
| 2,882,162 | Holahan | Apr. 14, 1959 |

UNITED STATES PATENT OFFICE
CERTIFICATE OF CORRECTION

Patent No. 2,998,317                                  August 29, 1961

Stanley H. Reesman

It is hereby certified that error appears in the above numbered patent requiring correction and that the said Letters Patent should read as corrected below.

Column 2, line 26, after "pressure" insert -- or --; column 3, line 38, for "most" read -- moist --; column 4, line 72, for "velovity" read -- velocity --; column 5, line 7, for "o" read -- of --.

Signed and sealed this 16th day of January 1962.

(SEAL)
Attest:

ERNEST W. SWIDER
Attesting Officer

DAVID L. LADD
Commissioner of Patents